(12) United States Patent
Nakamura et al.

(10) Patent No.: US 7,155,540 B2
(45) Date of Patent: Dec. 26, 2006

(54) DATA COMMUNICATION METHOD IN SHARED MEMORY MULTIPROCESSOR SYSTEM

(75) Inventors: Tomohiro Nakamura, Hachioji (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 597 days.

(21) Appl. No.: 10/217,485

(22) Filed: Aug. 14, 2002

(65) Prior Publication Data

US 2003/0177273 A1    Sep. 18, 2003

(30) Foreign Application Priority Data

Mar. 14, 2002  (JP) .............................. 2002-070099

(51) Int. Cl.
*G06F 15/16* (2006.01)
(52) U.S. Cl. ...................... 709/251; 709/213; 709/214; 711/148
(58) Field of Classification Search ................ 709/251, 709/213–214, 234; 711/148
See application file for complete search history.

(56) References Cited

U.S. PATENT DOCUMENTS

| | | | | |
|---|---|---|---|---|
| 5,097,409 | A | * | 3/1992 | Schwartz et al. ........... 711/145 |
| 5,551,048 | A | * | 8/1996 | Steely, Jr. ................... 711/141 |
| 6,058,458 | A | * | 5/2000 | Lee ............................. 709/214 |
| 6,253,292 | B1 | * | 6/2001 | Jhang et al. ................. 711/146 |
| 6,557,056 | B1 | * | 4/2003 | Lanteigne et al. .......... 711/147 |
| 6,665,774 | B1 | * | 12/2003 | Faanes et al. ............... 711/118 |
| 6,839,808 | B1 | * | 1/2005 | Gruner et al. .............. 711/130 |
| 2003/0084269 | A1 | * | 5/2003 | Drysdale et al. ............. 712/36 |

FOREIGN PATENT DOCUMENTS

| | | |
|---|---|---|
| JP | 02-041535 | 8/1988 |
| JP | 05-189380 | 1/1992 |
| JP | 2001-125875 | 10/1999 |
| JP | 2001-125875 | * 11/2001 |
| WO | WO 00/08564 | 7/1999 |

OTHER PUBLICATIONS

Kisaburo Nakazawa, Computer Architecture and Configuration of the Same:, Asakura Bookstore, Nov. 1995, pp. 388-389.

* cited by examiner

*Primary Examiner*—Philip B. Tran
(74) *Attorney, Agent, or Firm*—Reed Smith LLP; Stanley P. Fisher, Esq.; Juan Carlos A. Marquez, Esq.

(57) ABSTRACT

N shared data registers are provided for N+1 processors, respectively. For allowing all the processors to read the same data from the shared data registers, the processors are connected by interprocessor communication channels. The processors are classified into a master processor and subordinate processors. All data writing into the shared data registers are executed from the master processor. Further, data writing into the shared data registers from the subordinate processor is executed from the master processor after a write request is sent to the master processor.

5 Claims, 10 Drawing Sheets

DATA COMMUNICATION METHOD IN SHARED MEMORY MULTIPROCESSOR SYSTEM

BACKGROUND OF THE INVENTION

The present invention relates to a data communication method in a shared memory multiprocessor system and, in particular, to realizing data communication with coherence being maintained and speed-up of such data communication, and further to a coherence control.

In a shared memory multiprocessor system where a plurality of processors share a memory, it is necessary to communicate shared data between the processors upon executing parallel programs.

Conventionally, when performing communication of the shared data, a process called a lock process has been executed for maintaining coherence.

This process is a process for executing an exclusive control of data to allow one of the processors to exclusively read/write data shared by the processors.

The exclusive control can avoid an occurrence of wrong processing wherein, for example, the plurality of processors read/write simultaneously so that a readout value of data differs depending on order of access.

For realizing the exclusive control, a test and set instruction or the like provided for the processors is normally used.

The test and set instruction (1) reads out data, which is stored at a certain address on a memory, into a register; (2) writes a value "1" into the memory at the same address; and (3) determines whether a value read out into the register is "0".

The test and set instruction ensures inseparable execution of the foregoing operations (1) to (3) without being influenced or interrupted from the other processors during the execution thereof.

Only when the value read out into the register by the test and set instruction is "0", the subject processor determines that the exclusive control is realized, so that the subsequent exclusive control performs necessary processing.

After this processing is finished, this processor writes a value "0" into the memory at the same address, thereby to allow the other processors to realize the exclusive control.

On the other hand, if the value read out into the register by the test and set instruction is "1", the subject processor, determining that the exclusive control is not realized, executes again the test and set instruction, and then repeats it until a value read out into the register becomes "0".

The exclusive control using the test and set instruction is described in Kisaburo Nakazawa, "Computer Architecture and Configuration Method", Asakura Bookstore, November 1995, pp.388–389.

It is time-consuming to perform the data communication with coherence being maintained between the processors by executing the exclusive control based on the conventional lock process.

Particularly, when data transfer is frequently required, the processing speed may be largely lowered due to influence of the lock process.

This is caused by the fact that the lock process always requires data read/write processing on a main memory so that every execution of the test and set instruction requires much time.

Further, since the data read/write processing on the main memory based on the lock process is executed with respect to one same address, lowering of the memory access performance may be induced.

SUMMARY OF THE INVENTION

It is an object of the present invention to perform high-speed data communication with coherence being maintained between processors by adding a simple hardware structure, without using a time-consuming instruction such as a test and set instruction.

For accomplishing the foregoing object, in the present invention, each of processors in a shared memory multiprocessor system has a register allocated thereto for shared data communication, and shared data is written into these registers.

Each processor has a duplicate of the registers of the other processors. The processors have ring type network communication channels therebetween, and transfer the contents of the registers via these communication channels.

In data communication between the registers connected via the ring type network communication channels, one of a plurality of processors is set to be a main processor, and the other processors are set to be subordinate processors. When performing data writing into the registers of the respective processors, the subordinate processor transfers data to be written to the main processor through the ring type network. The data to be written is written into the registers of all the processors from the main processor through the ring type network.

Further, in the data transfer, buffers are provided for temporarily holding data transferred through the ring type network. Until a signal for allowing writing to all the processors is arrived from the main processor via the ring type network, the data is held in the buffer, and then the data is written into the register after arrival of the signal.

Other objects, features and advantages of the invention will become apparent from the following description of the embodiments of the invention taken in conjunction with the accompanying drawings.

DESCRIPTION OF THE EMBODIMENT

Figure 1:
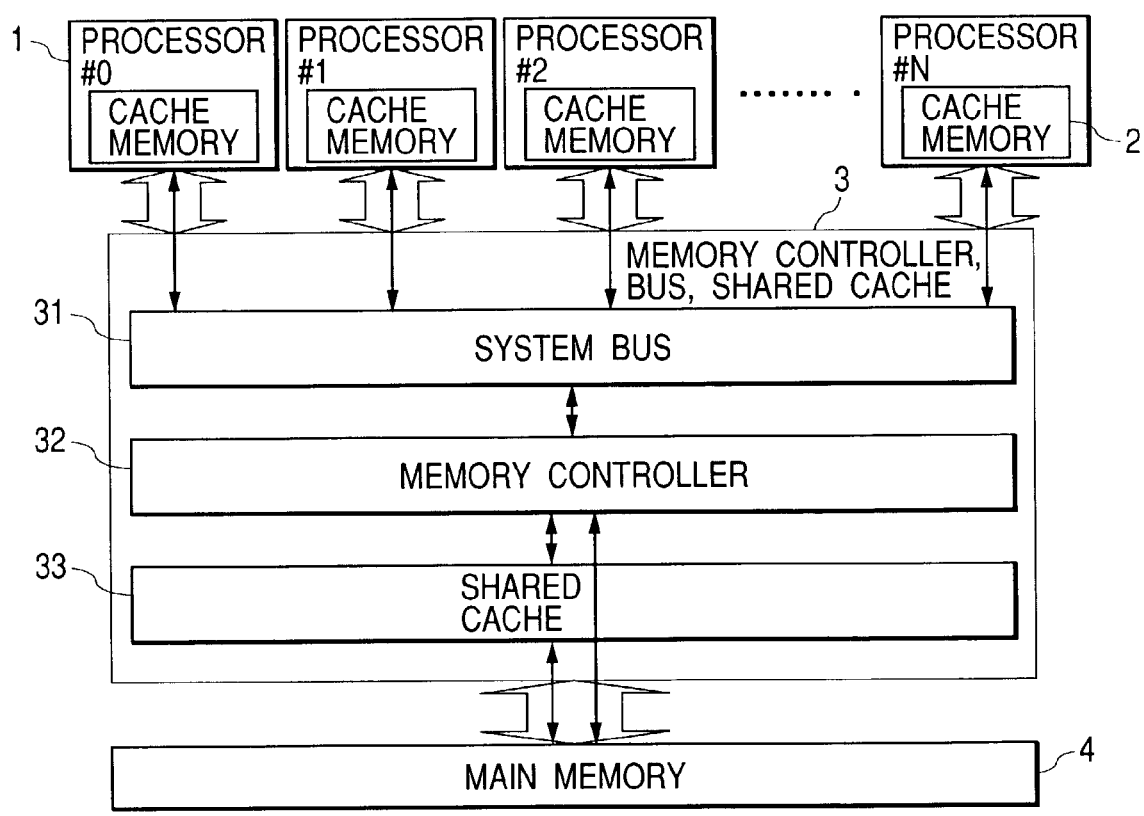
FIG. 1 is a diagram showing a configuration of a shared memory multiprocessor system in the field of the present invention.

A shared memory multiprocessor system in the field of the present invention includes, as shown in FIG. 1, a plurality of processors (1), a system bus (31), a memory controller (32) and a main memory (4).

A cache memory (2) is normally provided for each processor (1), and a shared cache (33) may also be provided for the processors (1).

In the figure, the system bus (31), the memory controller (32) and the shared cache (33) are collectively shown as memory controller, bus, shared cache (3).

In the shared memory multiprocessor system, the processors (1) logically share the single main memory (4), and access to the main memory (4) from each processor (1) is carried out via the system bus (31) and the memory controller (32). The system bus (31) may be replaced with a switch arrangement.

Each cache memory (2) allows the associated processor (1) to read/write a portion of data of the main memory (4) at high speed, and thus stores data necessary for the associated processor (1).

Accordingly, data stored in the cache memories (2) of the respective processors (1) include data of different addresses.

On the other hand, the shared cache (33) is shared by the plurality of processors (1), and thus stores data and so on required by the respective processors (1).

The shared cache (33) is arranged at a position nearer to the main memory (4) as compared with the cache memories (2) in the processors (1). Therefore, although much time is required for read/write processing, a cache memory with a larger capacity is normally used for the shared cache (33), thus resulting in high possibility of required data located in the shared cache (33).

Access to the shared cache (33) from each processor (1) is performed via the system bus (31) and the memory controller (32). Data transfer is carried out between the shared cache (33) and the main memory (4).

Figure 2:
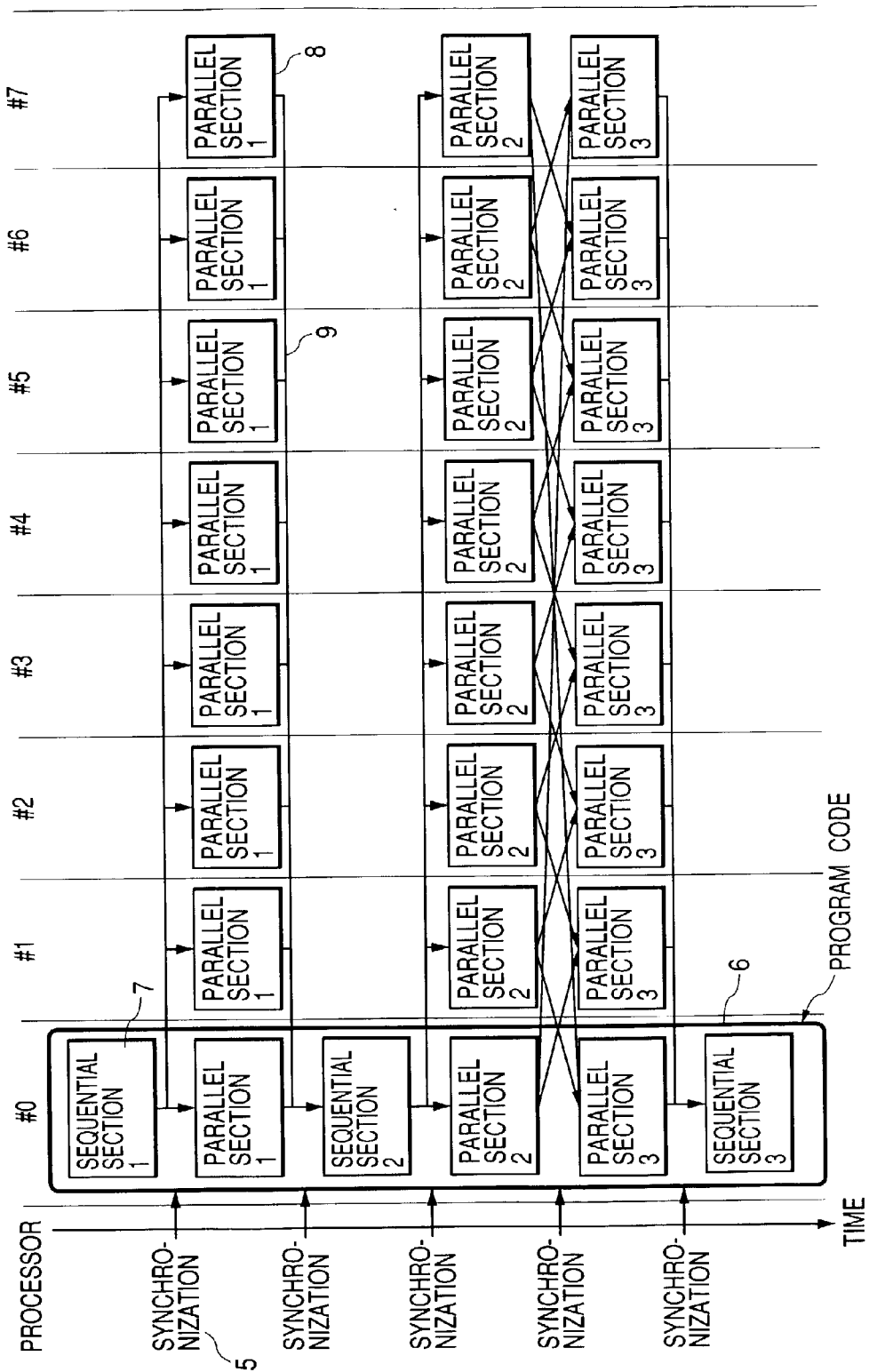
FIG. 2 is an exemplary diagram showing a relationship between parallel processing and data transfer in a multiprocessor system to be dealt with by the present invention.

FIG. 2 exemplarily shows an operation of parallel processing in the multiprocessor system.

FIG. 2, in which a time axis is vertically shown, illustrates an example wherein eight processors execute one program (6), a processor #0 executes a sequential section (7), and eight processors #0 to #7 execute parallel sections (8).

At a portion where shifting occurs from the sequential portion (7) to the parallel portions (8) and vice versa or at a portion where shifting occurs from a certain parallel processing to another parallel processing (in FIG. 2, a portion where shifting occurs from the parallel processing 2 to the parallel processing 3, a synchronization point (5) is provided for matching the timing of, for example, performing data transfer (9) between the processors.

For ensuring efficient processing in the multiprocessor system, it is necessary to perform processing at high speed at each synchronization point to efficiently achieve the data transfer (9).

At the synchronization point (5) where shifting occurs from the sequential processing 1 to the parallel processing 1, the data transfer (9) is carried out for distributing necessary data from processor #0 executing the sequential processing 1 to the processors which will execute the parallel processing 1. At the synchronization point (5) where shifting occurs from parallel processing 1 to sequential processing 2, the data transfer (9) is carried out for collecting data from the processors executing the parallel processing 1 to processor #0 which will execute the sequential processing 2. At the synchronization point (5) where shifting occurs from the parallel processing 2 to parallel processing 3, the data transfer (9) is carried out for exchanging data between the processors.

In the multiprocessor processing, it has been a large problem as to how to maintain coherence of shared data between the processors. In particular, while data transfer relating to synchronization among the processors requires strict coherence, the speed of read/write processing for shared data is a factor which largely influences the parallel processing performance.

However, another problem arises in view of cost if complicated hardware is provided for solving such a problem.

Therefore, the present invention realizes a technique for performing high-speed data communication with simple hardware while maintaining coherence of shared data.

Figure 3:
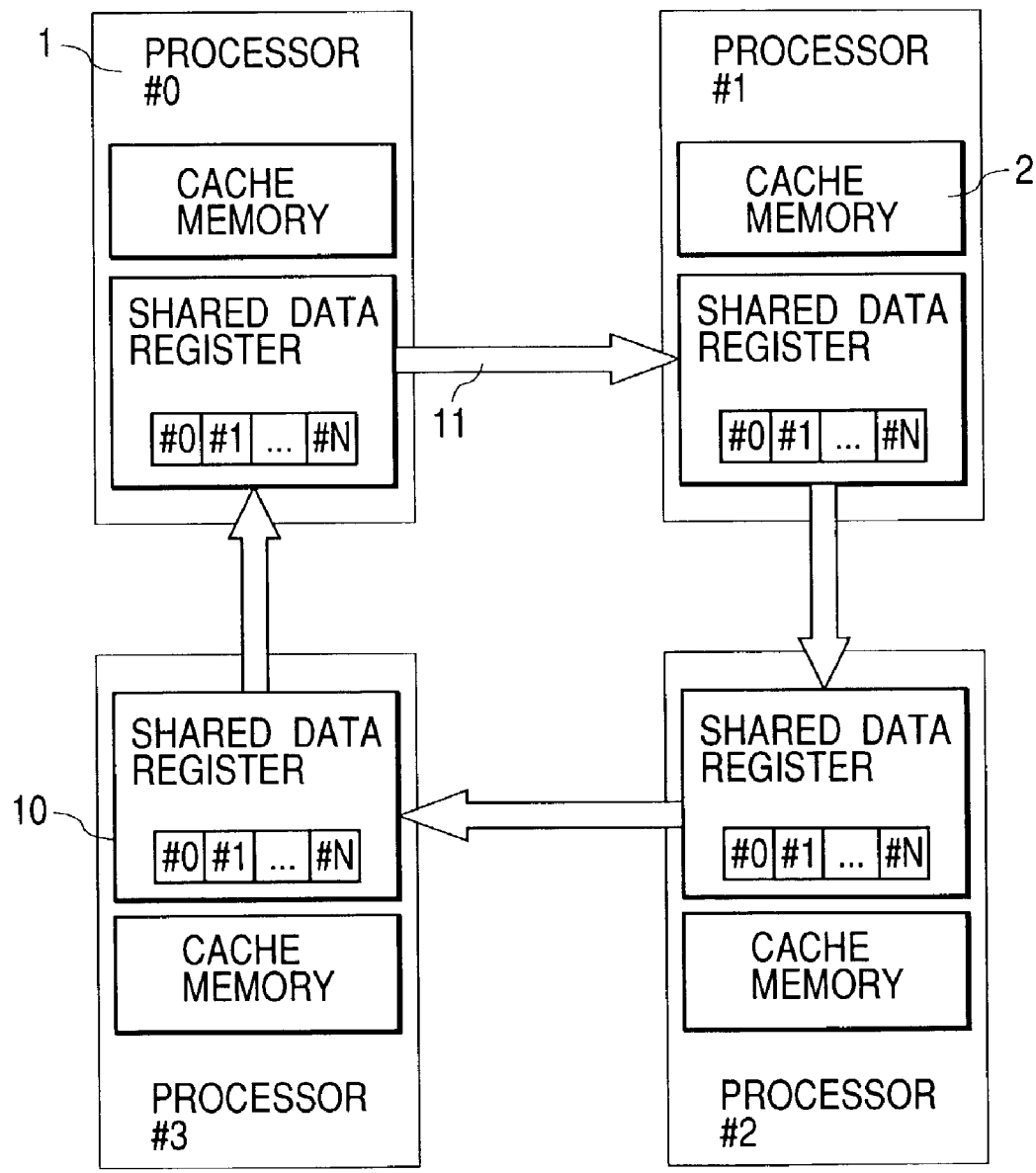
FIG. 3 is a diagram showing a configuration of a shared memory multiprocessor system having shared data registers and interprocessor communication channels, according to the present invention.

FIG. 3 shows shared data registers (10) and interprocessor communication channels (11).

As interprocessor communication channels, there may be proposed a crossbar type which forms a network closely in a one-to-one fashion, a star type which forms a star type network using a communication hub, and a ring type which forms a ring type network.

The crossbar type is excellent in communication speed, but complicated and high in cost, and further, flexibility is low against increment in number of processors.

The star type has a problem in that communication is concentrated to the hub.

The ring type is the simplest in structure and flexible against increment in number of processors, but low in performance.

The present invention adopts the ring type as the interprocessor communication channels (11) and realizes a coherence maintained communication system in the ring type network. FIG. 3 shows an embodiment wherein the ring type is used as the interprocessor communication channels (11). It may also be arranged that the shared data registers (10) are not provided and shared data is directly written into memories.

Figure 4:
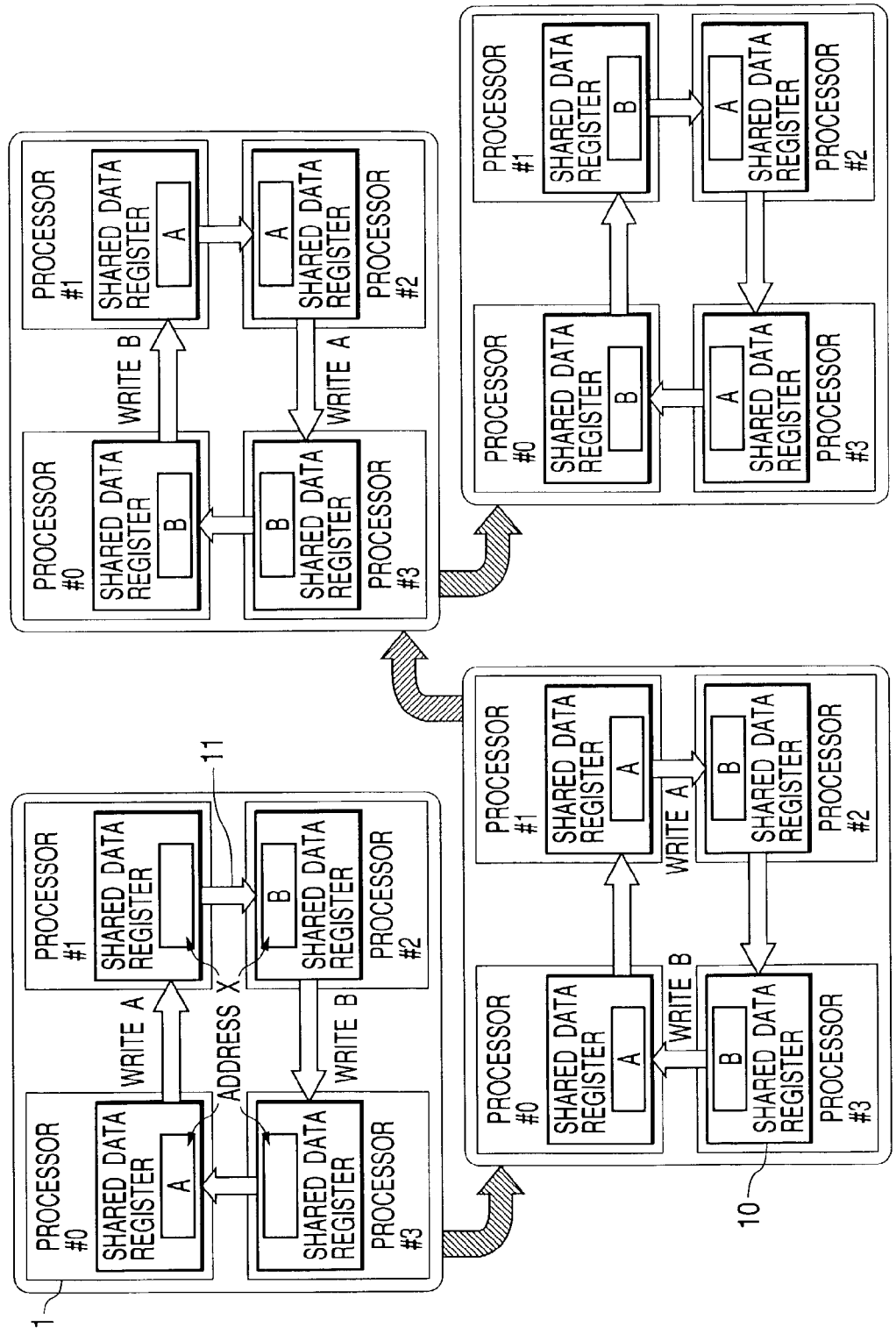
FIG. 4 is a diagram showing an example of data transfer processing in a ring type network, according to the present invention.

FIG. 4 shows an operation example of writing into the shared data registers (10) in the multiprocessor system having the interprocessor communication channels (11) according to the ring type network.

FIG. 4 shows in time sequence an operation wherein processor #0 and processor #2 simultaneously write different data A and B at the same address. A box of each shared data register (10) exemplarily shows data buffering relative to an address X.

Through the interprocessor communication channels (11) of the ring type network, a write A request for writing data A at certain address X is transferred from processor #0 to processors #1→#2→#3.

Similarly, a write B request for writing data B at the same address X is transferred from processor #2 to processors #3→#0→#1.

If the write request is transferred in the interprocessor communication channels 11 in this manner, the final state will be that data B is written at address X in processors #0 and #1, while data A is written at the same address X in processors #2 and #3.

This state means that if data is read out pursuant to a load instruction for the same address X, the read-out data differs depending on a reading processor.

Generally, simultaneous writing of different data at the same address should be inhibited by software. However, even if such a state occurs due to a program bug, coherence should be ensured among final values of data by means of hardware.

Figure 5:
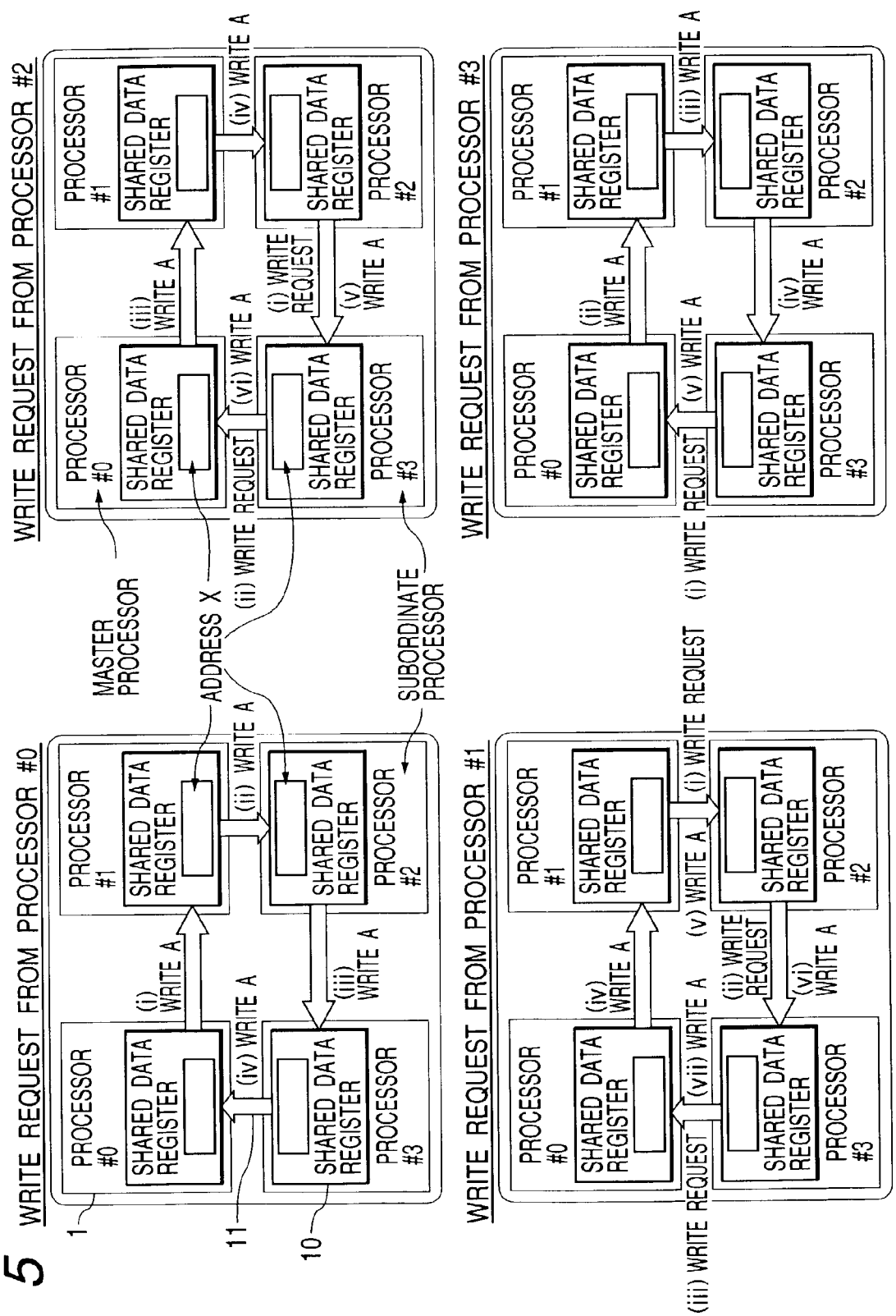
FIG. 5 is an exemplary diagram showing a processing method for maintaining coherence in data transfer processing in a ring type network, according to the present invention.

FIG. 5 exemplarily shows a coherence maintained communication system in the interprocessor communication channels (11) of the ring type network according to the present invention.

In an embodiment of the present invention, a processor whose processor number is the smallest is determined to be a master processor, while the other processors are determined to be subordinate processors, and only the master processor is allowed to start writing.

In FIG. 5, processor #0 becomes a master processor, and processors #1, #2 and #3 become subordinate processors.

In case of a write request from processor #0 being the master processor, writing into the shared data registers 10 of the processors are executed in order of (i)→(ii)→(iii)→(iv) as shown in FIG. 5.

On the other hand, in case of a write request from processor #1 being the subordinate processor, a write request is transferred in order of (i)→(ii)→(iii) without actual writing and reaches processor #0 being the master processor.

Then, from processor #0, actual writing into the shared data registers (10) of the processors is executed in order of (iv)→(v)→(vi)→(vii).

Likewise, in case of the other subordinate processors, only a write request is transferred with no execution of actual writing until it reaches processor #0 being the master processor, and then actual writing is executed in order from processor #0.

If arrival of a request from another processor and generation of a write request from the subject processor occur simultaneously, each processor preferentially processes the request from the other processor and makes its own request when there is no request from the other processors.

Determination of the master processor can be carried out by transferring processor numbers through the interprocessor communication channels (11) in the following manner.

(1) Each processor transmits its own processor number into the interprocessor communication channel (11);
(2) Upon receipt of a processor number of another processor from the interprocessor communication channel (11), the subject processor compares it with its own processor number. If its own processor number is smaller, the subject processor transmits its own processor number into the interprocessor communication channel (11). On the other hand, if its own processor number is greater, the subject processor transmits the received processor number of the other processor into the interprocessor communication channel (11) and becomes a subordinate processor.

If the received processor number is equal to its own processor number, the subject processor becomes a master processor.

Figure 6:
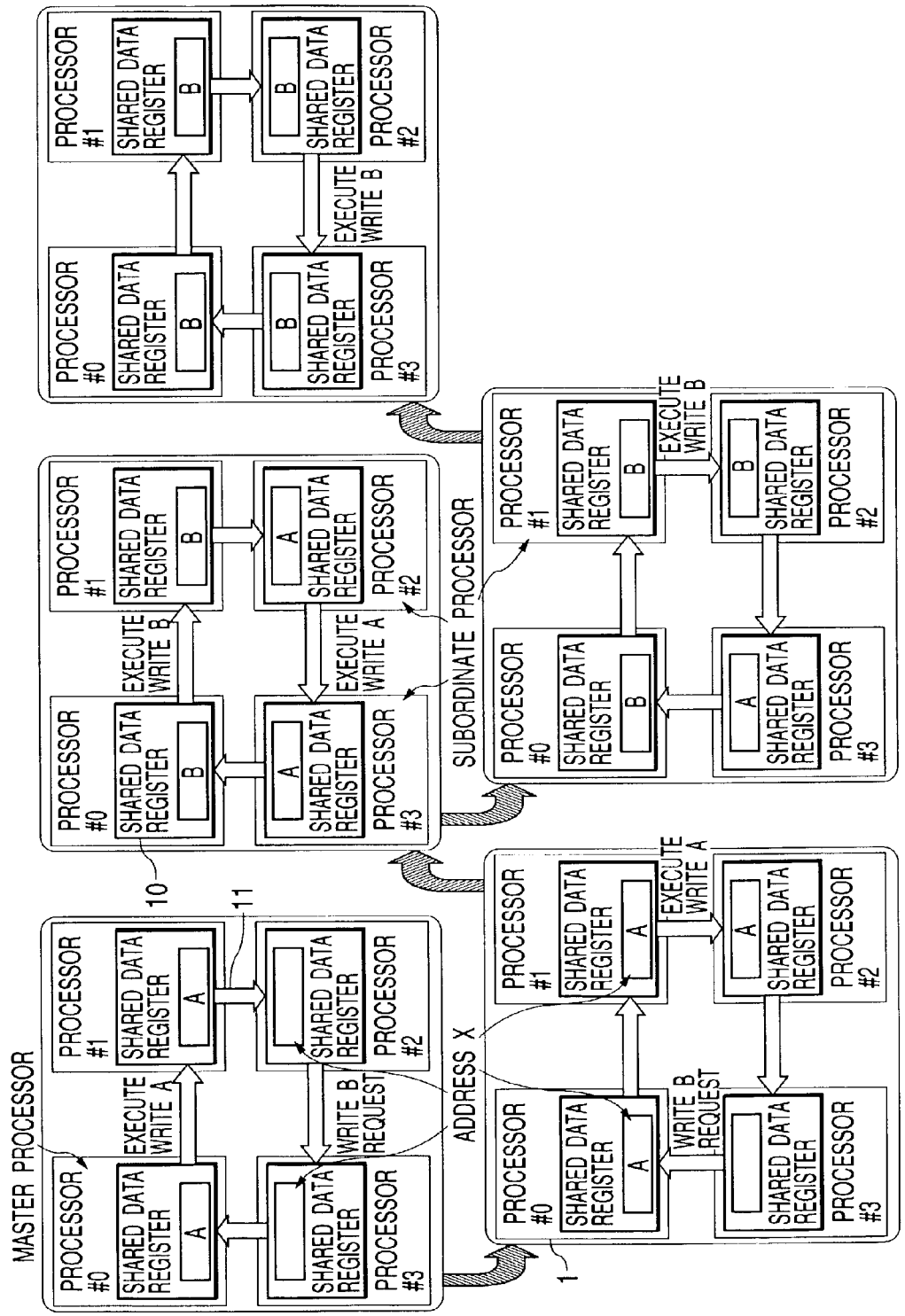
FIG. 6 is an exemplary diagram showing an operation example based on a processing method for maintaining coherence in data transfer processing in a ring type network, according to the present invention.

FIG. 6 is a diagram showing an operation, wherein writing into the shared data registers (10) is executed according to the method of the present invention when, like FIG. 4, a request from processor #0 for writing data A at address X and a request from processor #2 for writing data B at the same address X occur simultaneously.

First, with respect to the write request for data A from processor #0, since processor #0 is the master processor, writing of data A into the shared data registers (10) is executed in order from processor #0.

On the other hand, since processor #2 is the subordinate processor, processor #2 transfers only a write request to processor #3 where no actual writing of data B is executed.

When this request reaches processor #0 being the master processor, writing of data B into the shared data registers (10) is executed in order from processor #0.

Through the foregoing operation, data A is first written into the shared data registers (10) of all the processors, then data B is overwritten thereon. Accordingly, values of the shared data registers (10) of all the processors finally become data B and thus match with each other.

Figure 7:
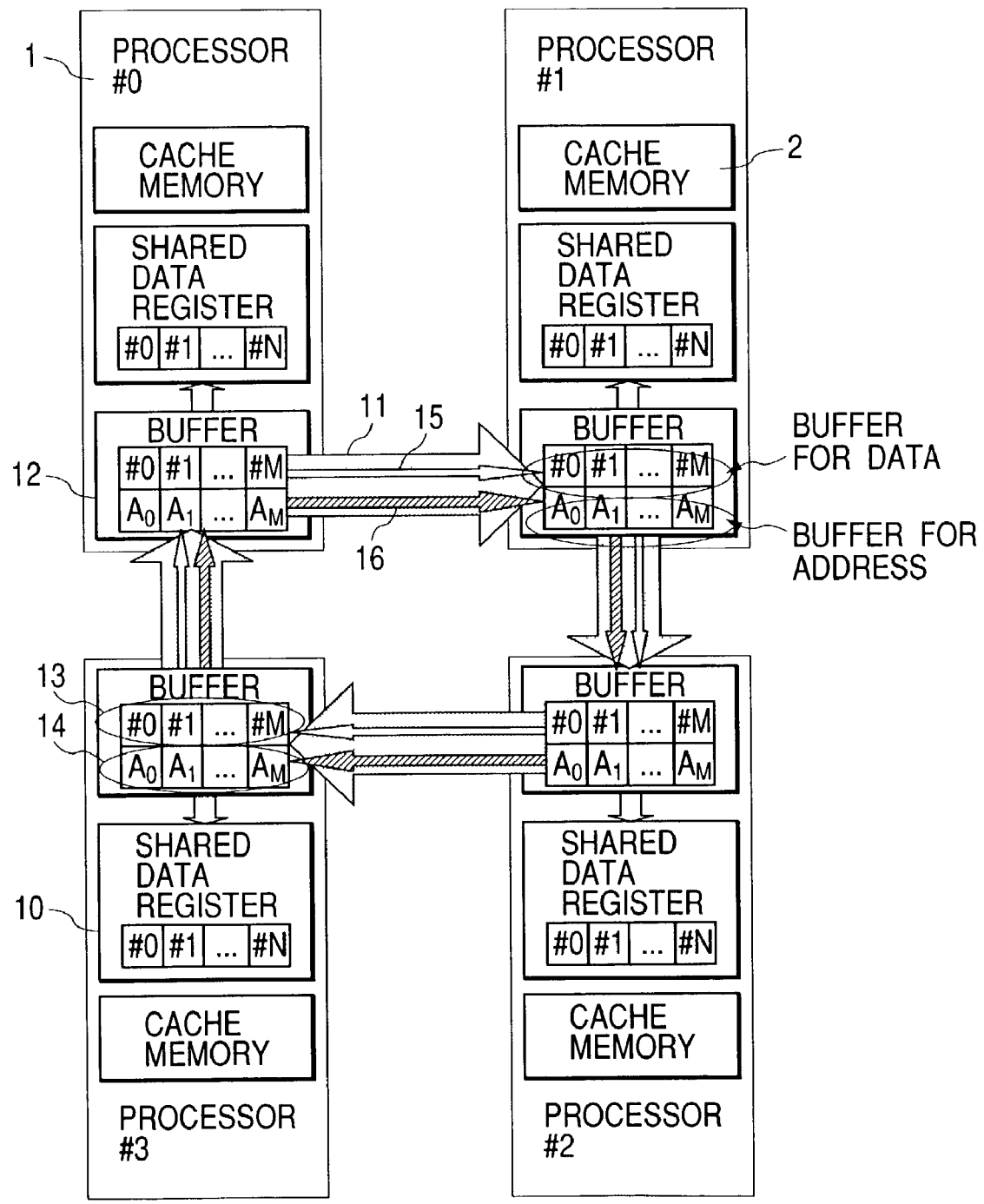
FIG. 7 is a diagram showing a configuration of a shared memory multiprocessor system which is provided with buffers in addition to shared data registers and interprocessor communication channels, according to the present invention.

FIG. 7 shows another embodiment of the present invention, wherein a buffer (12) is provided in each processor (1), in addition to the shared data register (10).

Each of the interprocessor communication channels (11) includes a data communication channel (15) and an address/command communication channel (16). Data transferred in each of the data communication channels (15) is first recorded in a buffer for data (13), i.e. a data buffer, of the buffer (12).

On the other hand, address/data transfer ID transferred in each of the address/command communication channels (16) is first recorded in a buffer for address (14), i.e. an address buffer, of the buffer (12).

In the address/command communication channel are transferred, in addition to an address at which data should be written, an ID for corresponding data transfer, a command for commanding data writing, a command for commanding transfer of data without writing it, a command for commanding writing of data identified by the ID into the shared data register (10) from the buffer (12), a command for notifying completion of data writing, a command for notifying a processor number for determining the master processor or the subordinate processor, a command for commanding data reading, and a command for commanding initialization of data and address.

If correspondence between data and address/command can be identified, it is not necessary that the data and the address/command arrive simultaneously with each other.

Figure 8:
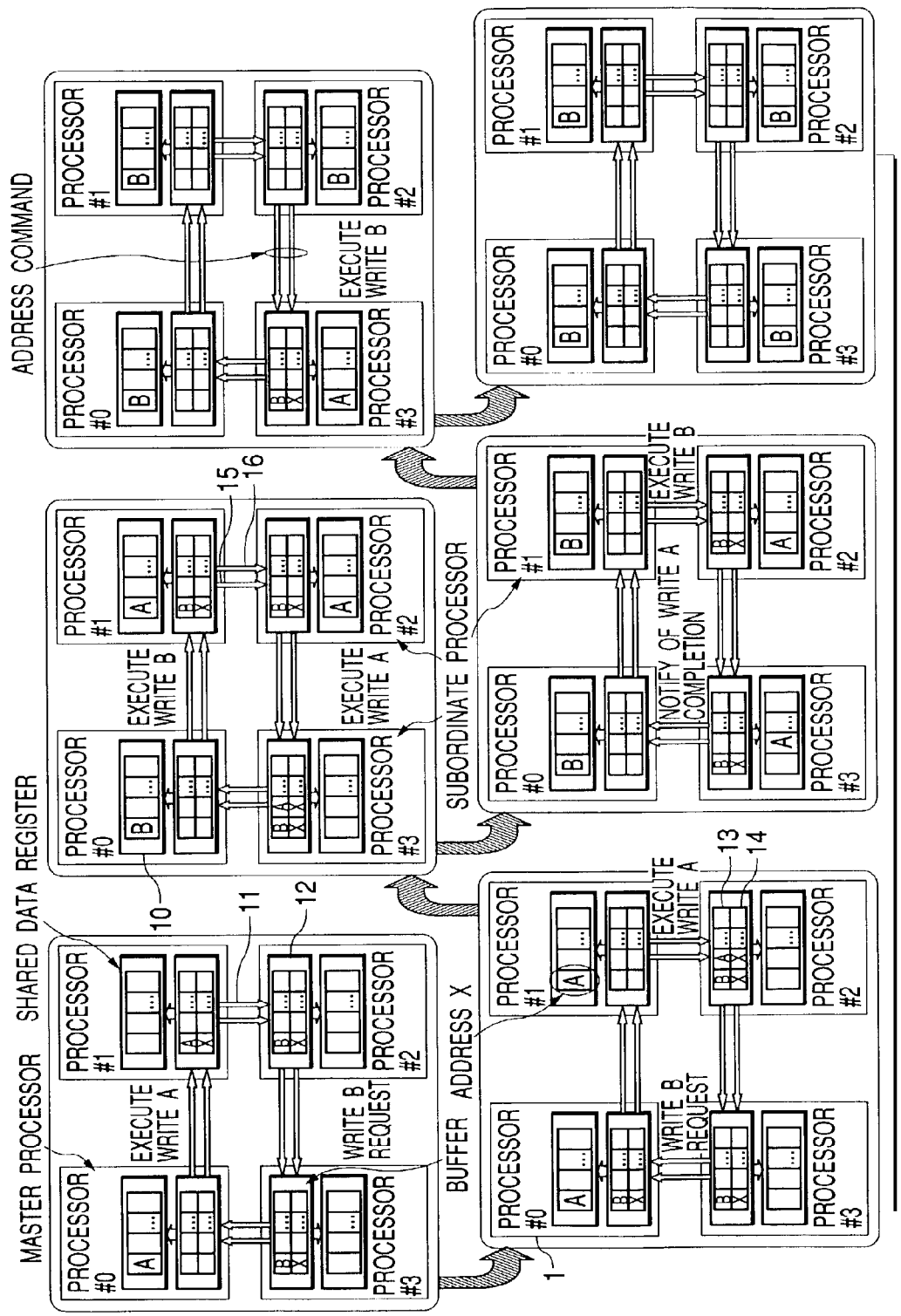
FIG. 8 is an exemplary diagram showing an operation example based on a processing method for maintaining coherence using buffers in data transfer processing in a ring type network, according to the present invention.

FIG. 8 is a diagram showing an operation, wherein writing into the shared data registers (10) is executed according to the method of the present invention as shown in FIG. 7 when, like FIG. 4, a request from processor #0 for writing data A at address X and a request from processor #2 for writing data B at the same address X occur simultaneously.

In FIG. 8, a dot-meshed arrow represents that data or address/command is transmitted in a corresponding communication channel or wiring.

Processor #0 is the master processor, and transmits data A into the data communication channel (15) and a command for writing at address X into the address/command communication channel (16).

In response to receipt of this data transfer, each processor first records data A and address X in the buffer (12), then writes data A into the shared data register (10) at a portion where data of address X should be recorded.

Processor #3 being the final subordinate processor, in response to receipt of data transfer of data A, notifies only the completion of data transfer processing of data A. For enabling it, processor #3 needs to recognize itself as being the final subordinate processor.

Processor #3 may transfer the received data and address/command to processor #0 being the master processor. In this event, the master processor may interpret a write command received from the interprocessor communication channel as a notification of the completion.

On the other hand, with respect to a request for writing data B at address X transferred from processor #2, since processor #2 is the subordinate processor, processor #2 transmits into the address/command communication channel (16) a command for transferring data without writing it at address X.

Through this data communication, each of the processors records data B and address X into the buffer (12), but executes no writing into the shared data register (10).

When this data transfer reaches the master processor, the master processor changes the received address/command, which is to be transmitted to the address/command communication channel (16), into a command for writing at address X, and then transmits it into the address/command communication channel (16).

Thereafter, data B is written into the shared data register (10) in each processor in the same manner as data A.

When the command for writing data B at address X arrives processor #2 being the original sender of data B, processor #2 changes the received command into a command for writing data identified by the corresponding data transfer ID into the shared data register (10) from the buffer (12), and transmits it, but does not transmit data B. This is because data B has already been recorded in the buffer (12) of processor #3.

Figure 9:
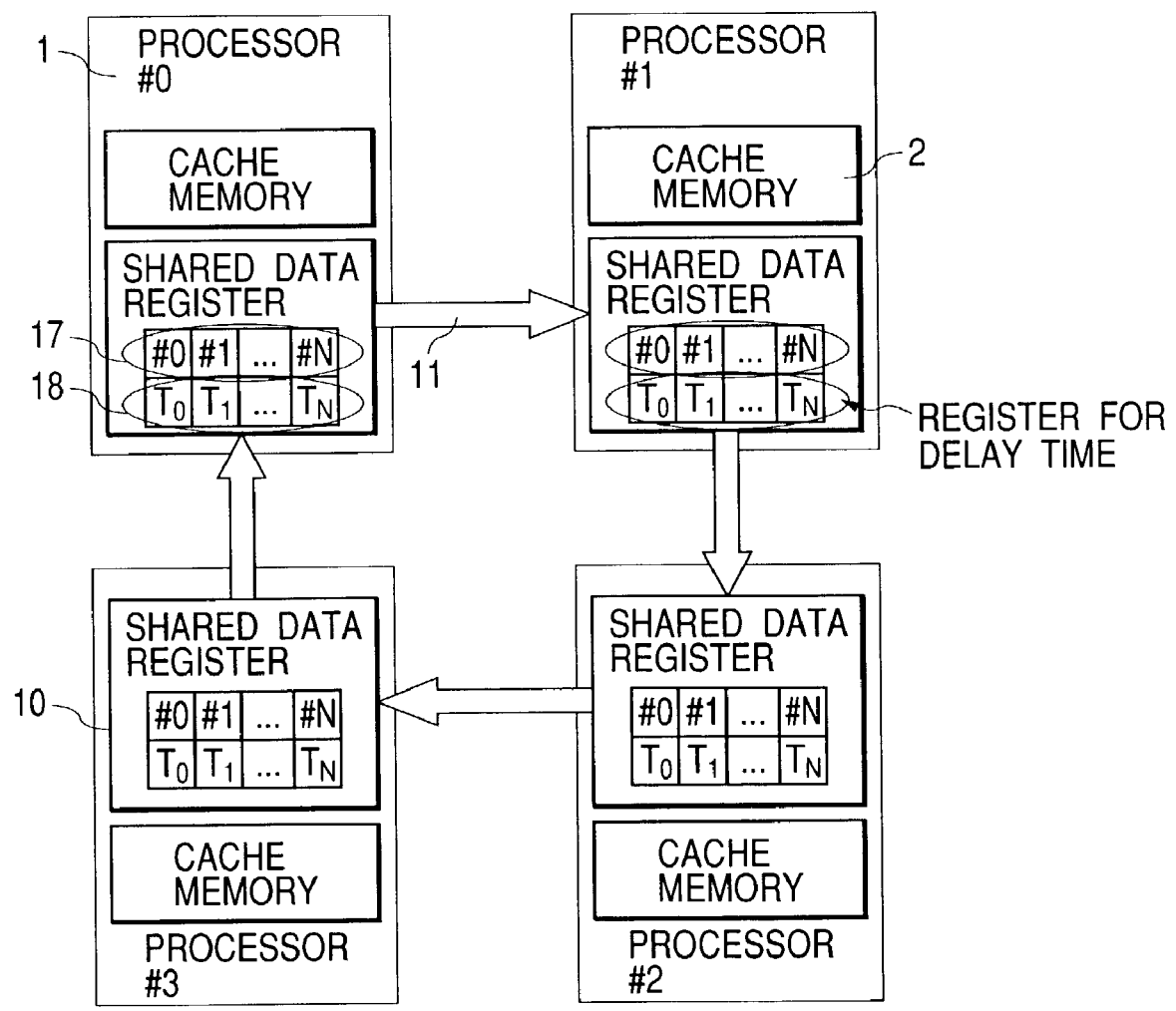
FIG. 9 is a diagram showing a configuration of a shared memory multiprocessor system which is provided with registers for delay time in addition to shared data registers and interprocessor communication channels, according to the present invention.

FIG. 9 shows a configuration wherein registers for delay time (18), i.e. delay time registers, are further provided in addition to the shared data registers (10) and the interprocessor communication channels (11) shown in FIG. 3.

Each processor carries out data transfer by adding a processor ID unique to each processor, and records this processor ID in the register for delay time (18).

The processor ID is determined in the following manner. Assuming that the number of all the processors is Y, the master processor is assigned Y-1, and subsequently, the other processors are assigned Y-2, Y-3, . . . , 1, 0 in order of connection to the ring type network, i.e. the processor ID is reduced one by one in order of the connection.

Assuming that a time required for data transfer from one processor to the next processor is "1", actual data recording into the shared data register 10 is delayed by a time corresponding to a value recorded in the register for delay time (18).

According to the foregoing processor ID determining method, the processor having the processor ID of Z completes data transfer time Z earlier than the processor having the processor ID of "0". Thus, by delaying actual data recording into the shared data register (10) by the time Z, a relationship of order of data writing can be guaranteed in terms of an absolute time on which data transfer is started.

In case of data of which data transfer is simultaneously started, those data are simultaneously recorded into the shared data registers (10). In this event, if an address is the same or contention occurs with respect to a resource for writing, a preferential control based on processor ID may be executed commonly over all the processors, thereby to maintain coherence.

Figure 10:
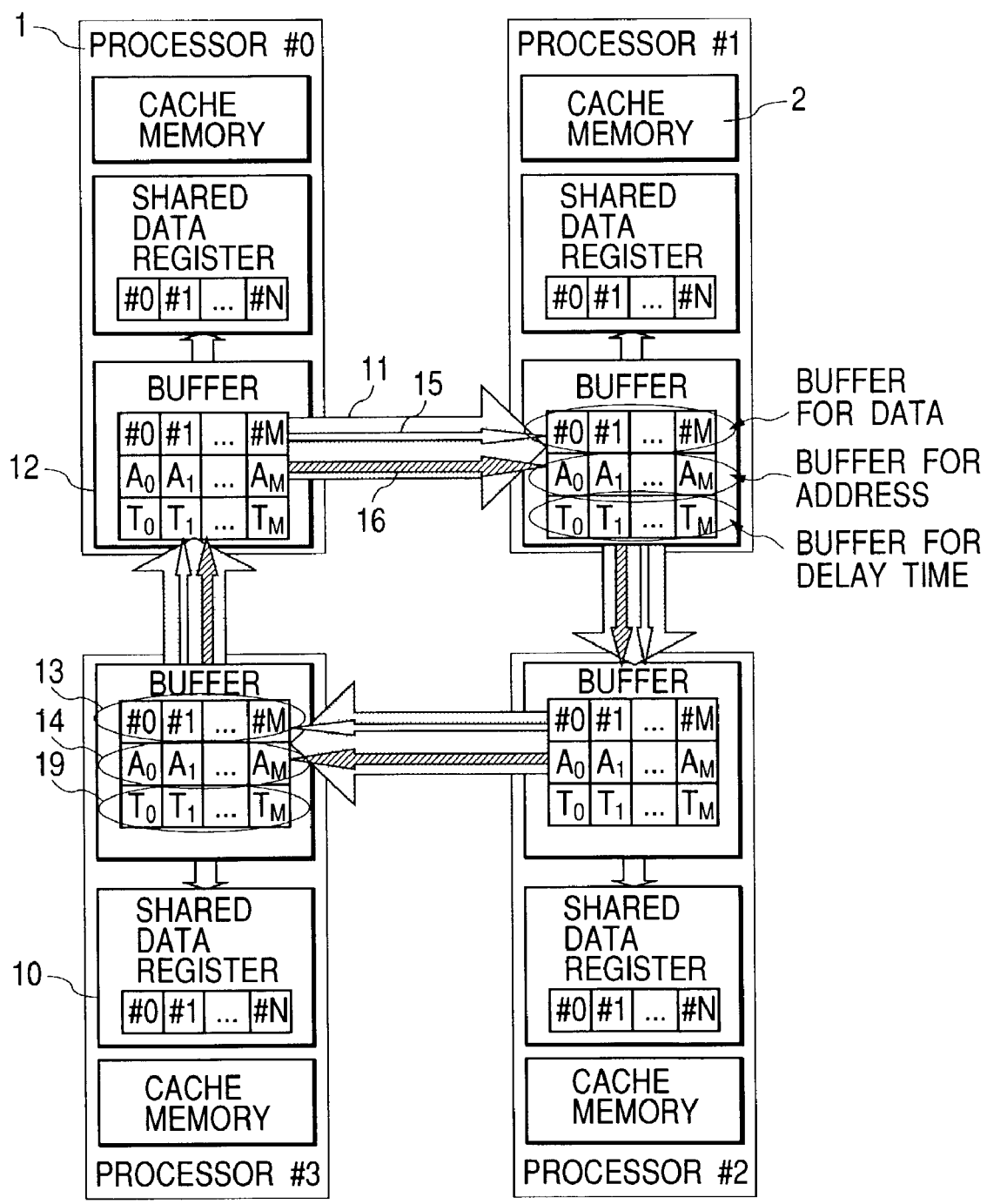
FIG. 10 is a diagram showing a configuration of a shared memory multiprocessor system which is provided with buffers and buffers for delay time in addition to shared data registers and interprocessor communication channels, according to the present invention.

In FIG. 10, buffers for delay time similar to the registers for delay time (18) are added to the configuration of FIG. 7 having the buffers (12).

Like the configuration of FIG. 9, data recording into the shared data registers (10) can be carried out by ensuring a relationship of order of data writing in terms of an absolute time on which data transfer is started. A difference from the configuration of FIG. 9 resides in that data recording is delayed by holding data in the buffers (12).

According to the present invention, the data transfer processing with coherence being maintained can be performed at high speed in the multiprocessor system.

Further, by providing the buffers, traffic in the communication channels can be reduced to realize the data transfer processing with increased using efficiency of the communication channels. Moreover, by providing delays with respect to the timing of data writing depending on a processor as an initial data sender, a relationship of order of data writing can be guaranteed in terms of an absolute time on which data transfer is started.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data communication method in a shared memory multiprocessor system having a plurality of processors and a memory, comprising:

providing a register for storing shared data in each of said processors;

connecting said processors by a ring type network;

setting one of said processors to being a main processor, and setting other processors to be subordinate processors;

when a subordinate processor attempts to write data into the register thereof, transmitting by said subordinate processor a command for transferring data to the main processor through said ring type network in one direction without writing the data into the register of said subordinate processor; and changing by the main processor the transmitted command for transferring data into a command for writing, and transmitting by the main processor said command for writing to all subordinate processors through said ring type network in said one direction in order to write the data into the register in each processor, wherein each of said processors has a unique identification number;

each of said processors performs data transfer through said ring type network by adding said identification number; and when said main processor performs data transfer for writing said data into said registers of all said processors through said ring type network, each of said processors performs said data transfer by adding a delay which depends on said identification number added upon said data transfer.

2. The data communication method according to claim 1, wherein each of said processors has a buffer for temporarily holding data transferred through said ring type network;

each of said processors holds said data in said buffer until a signal for allowing writing to all said processors is arrived from said main processor via said ring type network; and each of said processors writes said data into said register in response to arrival of said signal.

3. The data communication method according to claim 2, wherein each of said processors has a unique identification number;

each of said processors performs data transfer through said ring type network by adding said identification number; and when said data is stored into said register from said buffer in response to arrival of said signal for allowing said writing to all said processors from said main processor via said ring type network, each of said processors adds a delay which depends on said identification number.

4. The data communication method according to claim 1, wherein the direction is a clockwise or counter clockwise direction.

5. The data communication method according to claim 1, wherein said data is transferred from said one subordinate processor through said all subordinate processors in said ring type network towards said main processor in said one direction without writing said data in the register of each of said all subordinate processors until said data reaches said main processor.

* * * * *